US011025699B2

(12) United States Patent
Dhanabalan

(10) Patent No.: US 11,025,699 B2
(45) Date of Patent: Jun. 1, 2021

(54) METHOD TO DETERMINE OPTIMAL NUMBER OF HTTP2.0 STREAMS AND CONNECTIONS FOR BETTER QOE

(71) Applicant: Citrix Systems, Inc., Fort Lauderdale, FL (US)

(72) Inventor: Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/747,690

(22) Filed: Jan. 21, 2020

(65) Prior Publication Data

US 2020/0153886 A1 May 14, 2020

Related U.S. Application Data

(63) Continuation of application No. 15/787,482, filed on Oct. 18, 2017, now Pat. No. 10,587,668.

(51) Int. Cl.

| G06F 15/16 | (2006.01) |
| H04L 29/06 | (2006.01) |
| H04L 12/26 | (2006.01) |
| H04L 29/08 | (2006.01) |
| H04L 12/859 | (2013.01) |

(52) U.S. Cl.
CPC .......... *H04L 65/80* (2013.01); *H04L 43/0835* (2013.01); *H04L 43/0882* (2013.01); *H04L 43/16* (2013.01); *H04L 47/2475* (2013.01); *H04L 65/1069* (2013.01); *H04L 65/1089* (2013.01); *H04L 65/4015* (2013.01); *H04L 67/02* (2013.01); *H04L 69/14* (2013.01); *H04L 69/321* (2013.01)

(58) Field of Classification Search
CPC ................. H04L 65/80; H04L 65/1069; H04L 65/1089; H04L 65/4015; H04L 43/0835; H04L 43/0882; H04L 43/16; H04L 47/2475; H04L 67/02; H04L 69/14; H04L 69/321
See application file for complete search history.

(56) References Cited

PUBLICATIONS

Belshe et al., "Hypertext Transfer Protocol Version 2 (HTTP/2)," Request for Comments: 7540, Internet Engineering Task Force, May 2015, 96 pages.
Notice of Allowance for U.S. Appl. No. 15/787,482, dated Oct. 16, 2019.

*Primary Examiner* — Wing F Chan
*Assistant Examiner* — Joseph R Maniwang
(74) *Attorney, Agent, or Firm* — Foley & Lardner LLP

(57) ABSTRACT

Described embodiments provide for dynamically optimizing the number of application layer streams that may be multiplexed into a single transport layer connection, providing the advantages of application layer multiplexing without incurring unnecessary congestion-based network delays. A device may monitor net bandwidth and packet loss rates for a connection, and may dynamically increase and decrease a number of concurrent application layer streams to balance throughput and congestion avoidance. As congestion increases, the device may reduce concurrent stream limits in order to spawn additional transport layer connections, allowing faster congestion recovery and reduced performance impairment.

20 Claims, 5 Drawing Sheets

METHOD TO DETERMINE OPTIMAL NUMBER OF HTTP2.0 STREAMS AND CONNECTIONS FOR BETTER QOE

CROSS-REFERENCE TO RELATED APPLICATION

This patent application is a continuation of, and claims priority to and the benefit of U.S. patent application Ser. No. 15/787,482, titled "METHOD TO DETERMINE OPTIMAL NUMBER OF HTTP2.0 STREAMS AND CONNECTIONS FOR BETTER QOE," and filed Oct. 18, 2017, the contents of which are hereby incorporated herein by reference in its entirety for all purposes.

FIELD OF THE DISCLOSURE

The present application generally relates to application layer multiplexing and dynamic tuning of a number of concurrent application layer streams.

BACKGROUND OF THE DISCLOSURE

Early versions of the HyperText Transport Protocol (HTTP) allowed only one request between computing devices to be outstanding at any one time on a given transport control protocol (TCP) connection: specifically, a response needed to be received for any request, prior to sending a subsequent request. For basic systems and web pages, this was adequate, but as the web grew in complexity with pages having embedded graphics, videos, scripts, interactive content, and other elements, requiring each request to be fulfilled prior to submitting a next request was a cause of significant delays. To address this, most web browsers or other applications would open a plurality of transport layer connections so as to transmit a plurality of concurrent HTTP requests. However, this consumes a large amount of client and server resources (e.g. TCP sockets, transmission and receive buffer memory, etc.), as well as greatly increasing overhead and reducing network efficiency. For example, if a client device opens ten TCP connections in order to transmit ten concurrent requests, the three-way handshaking procedure required for each connection results in thirty back-and-forth synchronization transactions separate from the requests for the desired data.

HTTP version 2 addresses these issues by providing application layer multiplexing within a single TCP connection, reducing the amount of transport layer overhead required for communicating multiple application layer requests and responses and reducing latencies associated with the handshaking procedure. However, due to TCP congestion avoidance algorithms such as the slow start algorithm, when these multiple application layer streams are multiplexed within the single TCP connection, the resulting congestion window for the connection grows significantly slower compared to a net congestion window for a corresponding multiple number of TCP connections each carrying a single application layer stream. In case of packet loss, congestion window reduction differences can result in a significant performance impact, greatly reducing data throughput between the devices, and negatively affecting quality of experience (QoE) for users.

BRIEF SUMMARY OF THE DISCLOSURE

The systems and methods discussed herein provide for dynamically optimizing the number of application layer streams that may be multiplexed into a single transport layer connection, providing the advantages of application layer multiplexing without incurring unnecessary congestion-based network delays. A device may monitor net bandwidth and packet loss rates for a connection, and may dynamically increase and decrease a number of concurrent application layer streams to balance throughput and congestion avoidance. As congestion increases, the device may reduce concurrent stream limits in order to spawn additional transport layer connections, allowing faster congestion recovery and reduced performance impairment.

In one aspect, the present disclosure is directed to a method for managing concurrent application layer streams. The method includes establishing, by a network interface of a first device, a communication session with a second device, the communication session comprising a plurality of concurrent application layer streams. The method also includes determining, by a stream manager of the first device, that a net bandwidth utilization of the communication session is above a first predetermined threshold. The method also includes determining, by the stream manager responsive to determining that the net bandwidth utilization of the communication session is above the first predetermined threshold, that a packet loss rate of the communication session is above a second predetermined threshold. The method also includes transmitting, by the network interface to the second device, a first request to reduce a number of the plurality of concurrent streams, responsive to the determination that the packet loss rate of the communication session is above the second predetermined threshold.

In some implementations, the method includes transmitting the first request to reduce the number of the plurality of concurrent streams by transmitting a packet comprising a SETTINGS_MAX_CONCURRENT_STREAMS parameter with a predetermined value smaller than the number of the plurality of concurrent streams. In some implementations, the method includes subsequently determining, by the stream manager, that the packet loss rate of the communication session is below the second predetermined threshold; and transmitting, by the network interface to the second device, a second request to increase the number of the plurality of concurrent streams, responsive to the determination that the packet loss rate of the communication session is below the second predetermined threshold. In a further implementation, the method includes subsequently determining, by the stream manager, that the net bandwidth utilization of the communication session is below the first predetermined threshold; and responsive to determining that the net bandwidth utilization of the communication session is below the first predetermined threshold, transmitting, by the network interface to the second device, a second request to reduce the number of the plurality of concurrent streams. In a still further implementation, the first request comprises an identification of a lower number of concurrent streams than the second request.

In some implementations, the communication session comprises a hypertext transport protocol v2 (HTTP2) session. In some implementations, the method includes transmitting the first request to reduce the number of the plurality of concurrent streams by transmitting a settings frame comprising an identification of one or more configuration parameters for the communications session.

In another aspect, the present disclosure is directed to a method for managing concurrent application layer streams. The method includes establishing, by a network interface of a first device, a communication session with a second device, the communication session comprising a plurality of concurrent application layer streams. The method also includes receiving, by the network interface from the second device, a first request to reduce a number of the plurality of concurrent streams, transmitted responsive to a determination by the second device that (i) a net bandwidth utilization of the communication session is above a first predetermined threshold, and (ii) a packet loss rate of the communication session is above a second predetermined threshold; and transmitting via a first stream of the plurality of concurrent streams, by the network interface responsive to receipt of the first request to reduce the number of the plurality of concurrent streams, a packet comprising an indicator that at least one stream of the plurality of concurrent application layer streams is closed.

In some implementations, the method includes receiving the first request to reduce the number of the plurality of concurrent streams by receiving a packet comprising a SETTINGS_MAX_CONCURRENT_STREAMS parameter with a predetermined value smaller than the number of the plurality of concurrent streams. In some implementations, the method includes receiving a second request to increase the number of the plurality of concurrent streams, by the first device from the second device, transmitted responsive to a determination by the second device that the packet loss rate of the communication session is below the second predetermined threshold; and transmitting via the first stream of the plurality of concurrent streams, by the network interface responsive to receipt of the second request to increase the number of the plurality of concurrent streams, a second packet comprising the plurality of concurrent application layer streams. In a further implementation, the method includes receiving a second request to reduce the number of the plurality of concurrent streams, by the first device from the second device, transmitted responsive to a determination by the second device that the net bandwidth utilization of the communication session is below the first predetermined threshold; and transmitting via the first stream of the plurality of concurrent streams, by the network interface responsive to receipt of the second request to reduce the number of the plurality of concurrent streams, a packet comprising an indicator that a second at least one stream of the plurality of concurrent application layer streams is closed. In a still further implementation, the first request comprises an identification of a lower number of concurrent streams than the second request. In some implementations, the communication session comprises a hypertext transport protocol v2 (HTTP2) session. In some implementations, the method includes receiving the first request to reduce the number of the plurality of concurrent streams by receiving a settings frame comprising an identification of one or more configuration parameters for the communications session.

In another aspect, the present disclosure is directed to a system for managing concurrent application layer streams. The system includes a network interface configured to establish a communication session with a second device, the communication session comprising a plurality of concurrent application layer streams; and a stream manager. The stream manager is configured to determine that a net bandwidth utilization of the communication session is above a first predetermined threshold, and determine, responsive to determining that the net bandwidth utilization of the communication session is above the first predetermined threshold, that a packet loss rate of the communication session is above a second predetermined threshold. The network interface is further configured to transmit, to the second device, a first request to reduce a number of the plurality of concurrent streams, responsive to the determination that the packet loss rate of the communication session is above the second predetermined threshold.

In some implementations, the network interface is further configured to transmit a packet comprising a SETTINGS_MAX_CONCURRENT_STREAMS parameter with a predetermined value smaller than the number of the plurality of concurrent streams. In some implementations, the stream manager is further configured to subsequently determine that the packet loss rate of the communication session is below the second predetermined threshold; and the network interface is further configured to transmit, to the second device, a second request to increase the number of the plurality of concurrent streams, responsive to the determination that the packet loss rate of the communication session is below the second predetermined threshold. In a further implementation, the stream manager is further configured to subsequently determine that the net bandwidth utilization of the communication session is below the first predetermined threshold; and the network interface is further configured to transmit, to the second device, a second request to reduce the number of the plurality of concurrent streams, responsive to determining that the net bandwidth utilization of the communication session is below the first predetermined threshold. In a still further implementation, the first request comprises an identification of a lower number of concurrent streams than the second request. In some implementations, the network interface is further configured to transmit a settings frame comprising an identification of one or more configuration parameters for the communications session.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
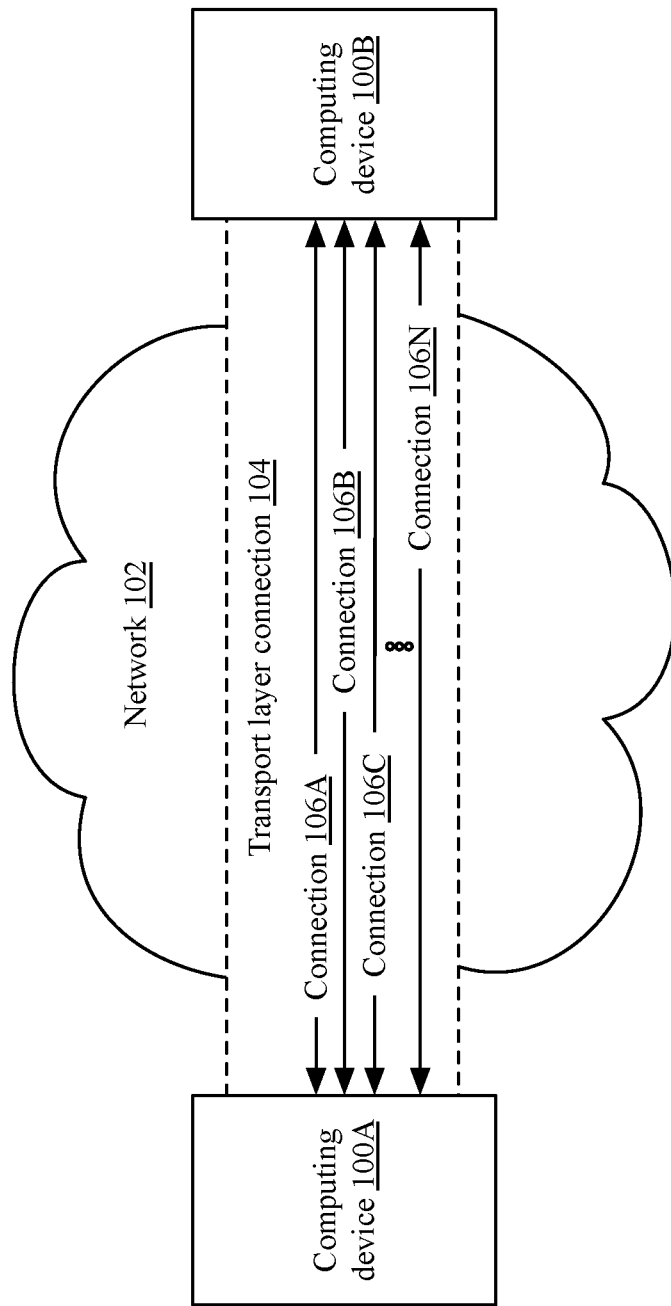
FIG. 1A is an illustration of an embodiment of multiplexing application layer connections via a transport layer connection.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Early versions of the HyperText Transport Protocol (HTTP) allowed only one request between computing devices to be outstanding at any one time on a given transport control protocol (TCP) connection: specifically, a response needed to be received for any request, prior to sending a subsequent request. For basic systems and web pages, this was adequate, but as the web grew in complexity with pages having embedded graphics, videos, scripts, interactive content, and other elements, requiring each request to be fulfilled prior to submitting a next request was a cause of significant delays. To address this, most web browsers or other applications would open a plurality of transport layer connections so as to transmit a plurality of concurrent HTTP requests. However, this consumes a large amount of client and server resources (e.g. TCP sockets, transmission and receive buffer memory, etc.), as well as greatly increasing overhead and reducing network efficiency. For example, if a client device opens ten TCP connections in order to transmit ten concurrent requests, the three-way handshaking procedure required for each connection results in thirty back-and-forth synchronization transactions separate from the requests for the desired data.

HTTP version 2 (HTTP/2, e.g. as described in the proposed Internet Engineering Task Force (IETF) RFC 7540, incorporated by reference herein in its entirety) addresses these issues by providing application layer multiplexing within a single TCP connection, reducing the amount of transport layer overhead required for communicating multiple application layer requests and responses and reducing latencies associated with the handshaking procedure. For example, FIG. 1A is an illustration of an embodiment of multiplexing application layer connections 106A-106N via a transport layer connection 104 between two computing devices 100A, 100B (referred to generally as computing device(s) 100). Computing devices 100 may comprise any type and form of computing device, including desktop computers, laptop computers, embedded computers, tablet computers, wearable computers, smartphones, workstations, rackmount computers, networked or smart appliances, set top boxes, video game systems, home automation systems, or any other type and form of device. Computing devices 100 may be physical devices, or virtual devices executed by one or more physical devices, and may be deployed individually, or in a cluster, farm, or cloud.

Computing devices 100 may establish a transport layer connection 104 over a network 102. Network 102 may comprise any network or combination of networks, including local area networks (LANs), metropolitan or medium area networks (MANs), wide area networks (WANs) such as the Internet, cellular networks, satellite networks, virtual private networks, mesh networks, peer to peer networks, or any other type and form of network. Network 102 may be homogenous or heterogeneous, and may be carried via any type of physical medium, including Ethernet, coaxial cable, fiber optic, cellular data, microwave, RF, optical over air, or any other type of medium. Multiple devices may be deployed as intermediaries between computing devices 100, including gateways, switches, routers, hubs, firewalls, network accelerators, or other devices.

Figure 1B:
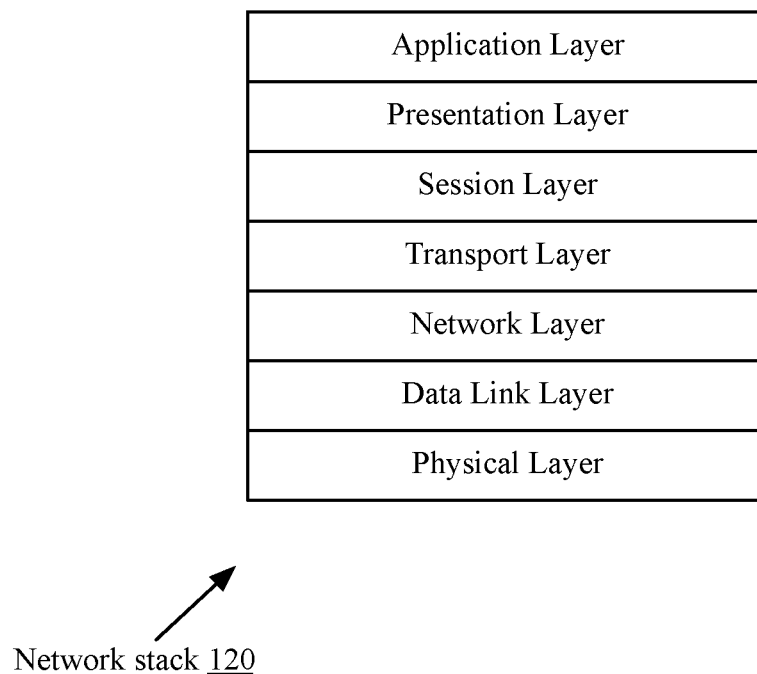
FIG. 1B is an illustration of an embodiment of a model of a network stack.

Transport layer connection 104 may comprise any type and form of transport layer connection, such as a transport control protocol (TCP) or user datagram protocol (UDP) connection. Referring briefly to FIG. 1B, illustrated is an embodiment of a model of a network stack 120 based on the open systems interconnect (OSI) model. A packet may comprise a payload at a higher level, e.g. the application layer, encapsulated in headers (and trailers or footers, in some implementations) of lower layers. Thus, for example, an application layer HTTP packet may be carried as a payload of a transport layer packet (which, itself, may be a payload of a network layer packet; which may be a payload of a data link layer frame; which may be transmitted via a physical layer protocol).

Returning to FIG. 1A, in application layer multiplexing protocols such as HTTP/2, a transport layer connection 104 may carry a plurality of application layer connections 106A-106N (referred to generally as application layer connection(s) 106, HTTP connection(s) 106, application layer stream(s) 106, or by similar terms). Headers and payloads of application layer connections 106 may be multiplexed or concatenated together within the payload of the transport layer connection 104, frequently with interstitial headers or stream identifiers to help the recipient device demultiplex the streams, which may be of varying lengths. This may reduce delays associated with connection establishment and reduce transport layer overhead compared to individually establishing transport layer connections for each application layer stream.

Figure 1C:
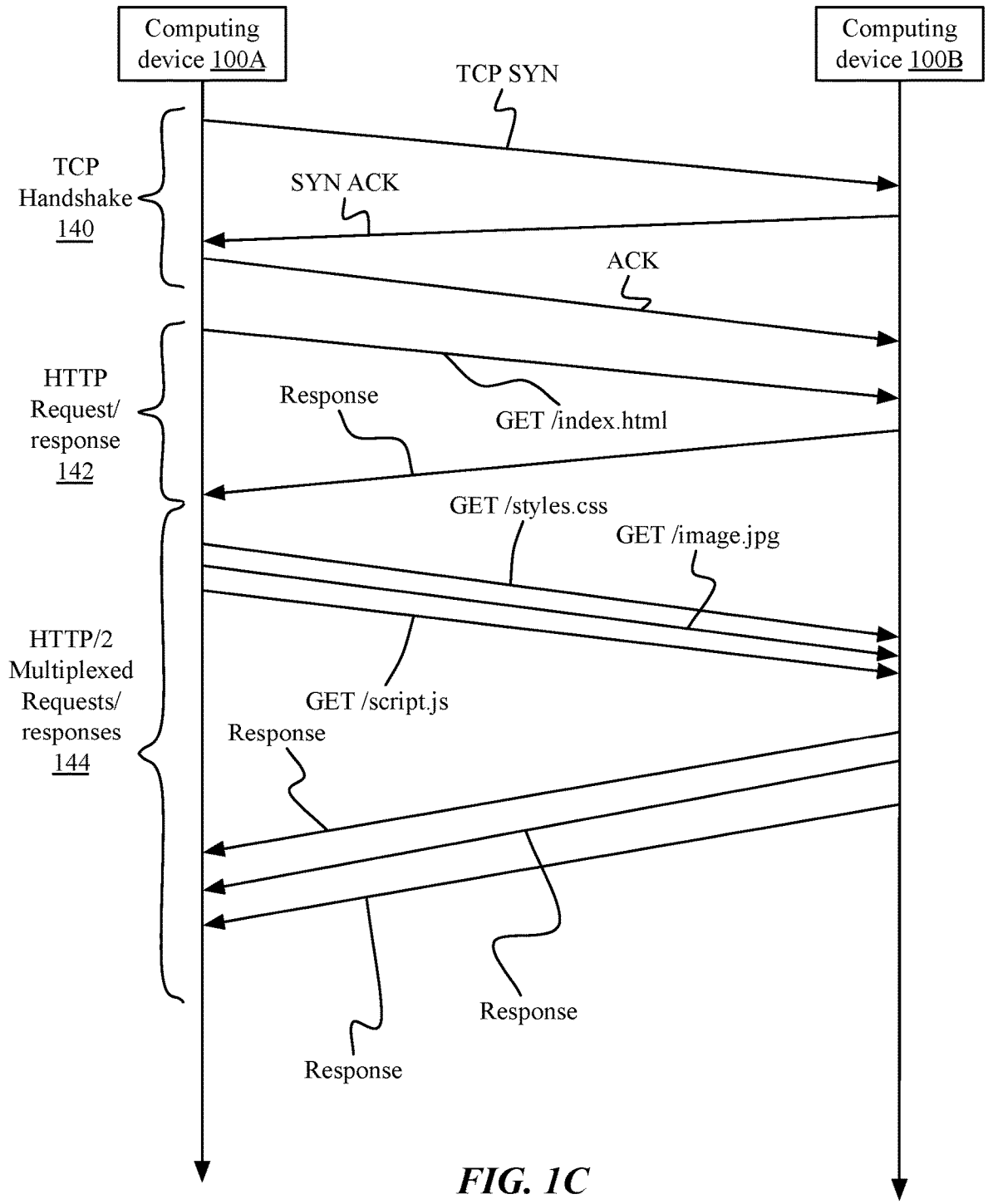
FIG. 1C is a flow diagram of an embodiment of multiplexing application layer connections via a transport layer connection.

For example, FIG. 1C is a flow diagram of an embodiment of multiplexing application layer connections via a transport layer connection. The transport layer connection may be established via a three-way handshake procedure 140, in some implementations, as in the TCP protocol, with a synchronization (SYN) packet, an acknowledgement to the SYN packet establishing mutual configuration settings (SYN ACK), and a further acknowledgment of the SYN ACK packet (ACK).

In many implementations, a first device may then transmit an application layer request 142, such as a GET request for a web page (e.g. GET/index.html). The second device may respond with the page, and may in some implementations, include a header specifying that multiple application requests may be multiplexed together in a single request. In some implementations, the header may include an identifier of a maximum number of application layer requests that may be multiplexed, such as a SETTINGS_MAX_CONCURRENT_STREAMS parameter or similar parameter. This may be sent in the same packet as the response to the request, or in a separate packet (e.g. a settings packet).

The web page may include references to other documents and data, such as embedded images (e.g. "image.jpg"), scripts (e.g. "script.js"), or cascading style sheets (e.g. "styles.css") that are required for fully rendering the page. The first computing device may parse the page to identify these references and may transmit the requests, multiplexed in accordance with the maximum number of concurrent streams parameter, via the single transport layer connection 144. The second device may similarly respond with the documents and data, similarly multiplexed, as shown. The responses may be transmitted in the same order as the requests, or in different orders. Accordingly, the first computing device may transmit multiple requests without needing to wait for each request to be fulfilled, greatly reducing time to load the page, and without performing additional handshakes as required when establishing separate transport layer connections for each application layer request.

Although shown as a communication between two devices, in many implementations, the first computing device 100A may establish communications with multiple second computing devices. For example, after receiving the web page, the first computing device 100A may request embedded images from a first data server, scripts from a second data server, etc. Any number of requests to any particular server may be multiplexed together within one transport layer connection.

While multiplexing application layer requests into a transport layer connection may reduce connection establishment overhead and thus increase data transmission efficiency, due to TCP congestion avoidance algorithms such as the slow start algorithm, the congestion window for the single connection grows significantly slower compared to a net congestion window for a corresponding multiple number of TCP connections each carrying a single application layer stream. For example, at the transport layer, a congestion window may be increased according to a slow-start algorithm at a predetermined rate, regardless of whether that connection carries a single HTTP request or response or an HTTP/2 stream encapsulating a plurality of requests or responses. In the slow-start algorithm, a congestion window is increased by one for each acknowledgement (ACK) received, effectively doubling the window size for each request-response round trip. A first pair of devices communicating 10 multiplexed requests via a single HTTP/2 over TCP connection will therefore have a congestion window that increases in size from n to 2n to 4n to 8n, etc. However, a second pair of devices communicating via ten TCP connections, each with a single HTTP request, will have similar congestion windows per connection, and therefore a total congestion window of 10n, 20n, 40n, 80n, etc., resulting in potentially much faster increase in total bandwidth.

Furthermore, in case of packet loss, congestion window reduction differences can result in a significant performance impact, greatly reducing data throughput between the devices, and negatively affecting quality of experience (QoE) for users. For example, in some implementations, the maximum window size of the single connection between the first pair of devices may be divided amongst the multiple connections of the second pair of devices discussed above. Assuming that these connections have been stable for some time, the congestion window of the single TCP connection for the first pair of devices may be 100 packets; and the congestion windows for each of the ten TCP connections for the second pair of devices may be 10 packets, resulting in equal net bandwidth per round trip time for each pair of devices. Given a TCP algorithm that reduces window size by half in response to a packet drop, if the single TCP connection between the first pair of devices drops a packet, the window is reduced to 50 packets. However, if a packet is dropped on one of the ten TCP connections between the second pair of devices, that one connection's congestion window is reduced to 5 packets, but the other nine connections' windows remain at 10 packets, resulting in a total window size of 95 packets. Worse, if a second packet is dropped, the single TCP connection between the first pair of devices may reduce its window to 25 packets. Conversely, if the second dropped packet is on the same one of the ten TCP connections between the second pair of devices, its window is reduced to 2 packets (in implementations that round down to an integer number of packets), while the other nine connections remain unmodified, resulting in a total window size of 92 packets. If instead, the second dropped packet is on a different connection, then the window size may be reduced to 90 packets (or possibly remain at 95 packets, if, for example, the first connection has recovered and re-increased its window size to 10 packets).

Thus, it may be important to dynamically balance the competing pressures of reduced overhead and connection efficiency of multiplexed application layer communications, and increased window size growth and congestion resiliency of multiple transport layer connections. The systems and methods discussed herein provide for dynamically optimizing the number of application layer streams that may be multiplexed into a single transport layer connection, providing the advantages of application layer multiplexing without incurring unnecessary congestion-based network delays. A device may monitor net bandwidth and packet loss rates for a connection, and may dynamically increase and decrease a number of concurrent application layer streams to balance throughput and congestion avoidance. As congestion increases, the device may reduce concurrent stream limits in order to spawn additional transport layer connections, allowing faster congestion recovery.

Specifically, in some implementations, when there is a large amount of bandwidth available, the system may utilize fewer transport layer connections with more application layer streams multiplexed in each connection. Similarly, as latency increases, the system may utilize fewer transport layer connections with more application layer streams per connection. This may increase efficiency by reducing overhead. However, as packet loss rates increase, the system may use more transport layer connections and fewer application layer connections.

In one implementation, the device may modify a concurrent stream value in a configuration packet or header of a packet, such as the SETTINGS_MAX_CONCURRENT_STREAMS value in the HTTP/2 protocol. In some implementations, the concurrent stream value may be set to a value proportional to the number of packet drops or losses from a previous connection, or may be set to a default value. The device may measure a rate of packet drops or losses and dynamically tune the concurrent stream value to limit the number of streams, forcing the other device it is communicating with to spawn additional transport layer connections to carry additional application layer communications or streams. For example, if the connection experiences a large number of packet drops, the device may set a SETTINGS_MAX_CONCURRENT_STREAMS to a small number (e.g. 2 or 3), and causing other devices to create more transport layer connections.

Thus, in one example implementation, given a bandwidth threshold B' and a packet loss threshold P' (e.g. 10 packets per second, or any other such value):

```
IF current bandwidth B > B' {
    IF current packet loss rate P > P' {
        Set SETTINGS_MAX_CONCURRENT_STREAMS to N1 for
        that connection;
    } ELSE {
        Set SETTINGS_MAX_CONCURRENT_STREAMS to N2 }
ELSE {
Set SETTINGS_MAX_CONCURRENT_STREAMS to N3 };
``` with N1<N3<N2. For example, in one such implementation, N1 may be equal to 2, N2 may be equal to 20, and N3 may be equal to 10.

Accordingly, the system can balance multiplexing for better efficiency with optimized congestion avoidance, resulting in lower latency, higher throughput, less user frustration, and higher QoE.

Although discussed primarily in terms of two devices communicating with each other and the method being applied by either endpoint, in many implementations, the method may be applied by an intermediary device between two endpoints. For example, in some implementations, a network accelerator may be deployed between two computing devices. The network accelerator may monitor bandwidth and packet loss rate for the connections, and may insert configuration packets or modify configuration settings in packets of the connections traversing the device, causing the endpoints to create more application layer streams within a connection or more transport layer connections each carrying fewer streams. Thus, the computing device discussed herein may refer to an endpoint of the transport layer connection, or an intermediary device receiving and forwarding packets of the connection.

Furthermore, although discussed primarily in terms of the HTTP/2 and TCP protocols, the systems and methods discussed herein may be applied to any application layer protocol that allows or provides multiplexing of application layer requests and responses within a single transport layer connection.

Figure 2:
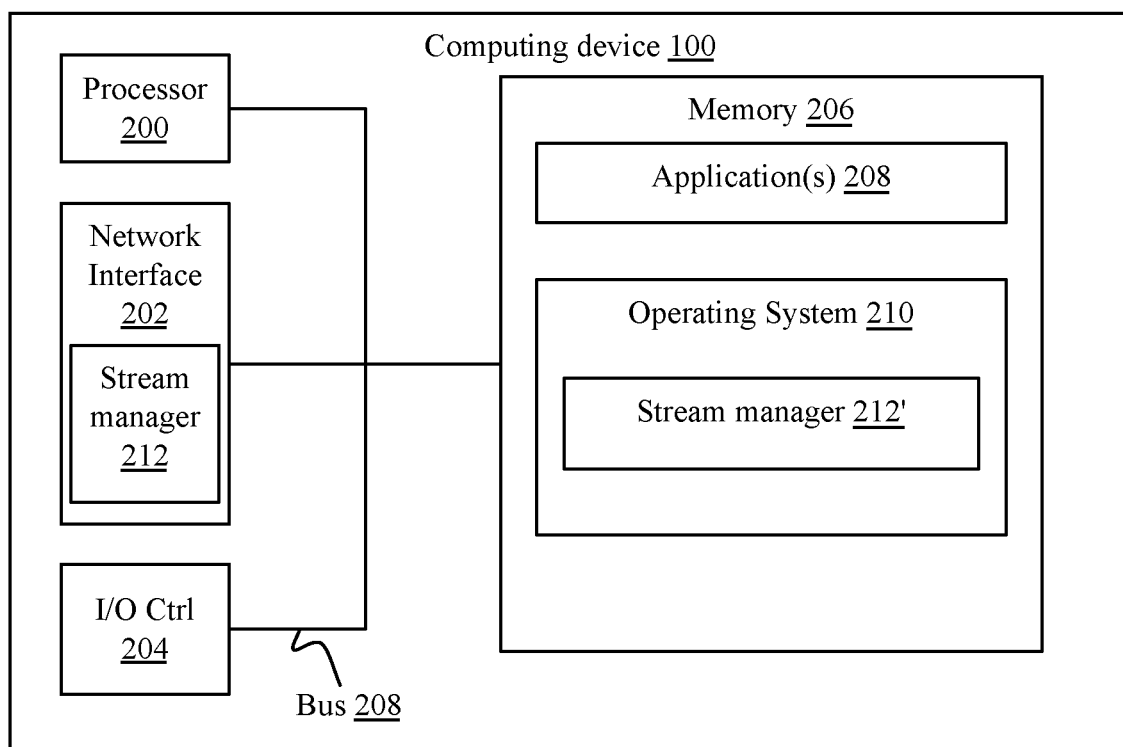
FIG. 2 is a block diagram of an embodiment of a computing device for dynamically optimizing the number of application layer streams that may be multiplexed into a single transport layer connection.

FIG. 2 is a block diagram of an embodiment of a computing device 100 for dynamically optimizing the number of application layer streams that may be multiplexed into a single transport layer connection, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface 202 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A client device or server of the sort depicted in FIG. 2 may operate under the control of an operating system 210, which control scheduling of tasks and access to system resources. The client device or server can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

A computing device 100 may execute one or more applications 208. Applications 208 may comprise any type and form of application, service, daemon, routine, or other executable logic, and may communicate with remote computing devices via application layer protocols. Applications 208 may include web browsers, media players, multiplayer video games, voice over internet protocol (VoIP) or chat applications, social network applications, or any other type and form of applications. In some implementations, applications 208 may include servers for communicating with other applications, such as web servers, file servers, streaming video servers, database servers, or other such applications. Applications 208 may each comprise a plurality of files, including executable files, libraries, data files, parameter or preference files, registry keys, configuration files, graphics, audio files, video files, dictionaries, templates, or any other type and form of data. An application 208 may exist in a plurality of versions, and may be identified by a version number, name, or other indicator.

Computing device 100 may comprise or execute a stream manager 212. Stream manager 212 may be part of the network interface 202. For example, stream manager 212 may comprise circuitry such as an ASIC circuit on a network interface card. In another implementation, stream manager 212 may be executed by a coprocessor or packet processor of the network interface. In still another implementation, a stream manager 212' may be part of an operating system 210, such as part of a network driver or system kernel. Stream manager 212 may comprise an application, service, daemon, routine, or other executable logic for monitoring bandwidth and packet loss of a transport layer connection, and for adjusting the value of a concurrent stream parameter for application layer requests and responses multiplexed via the connection. In some implementations, stream manager 212 may be configured to perform additional processing for the connection, such as generating configuration or settings packets for transmission by the network interface, modifying parameters of a network stack, etc.

Figure 3:
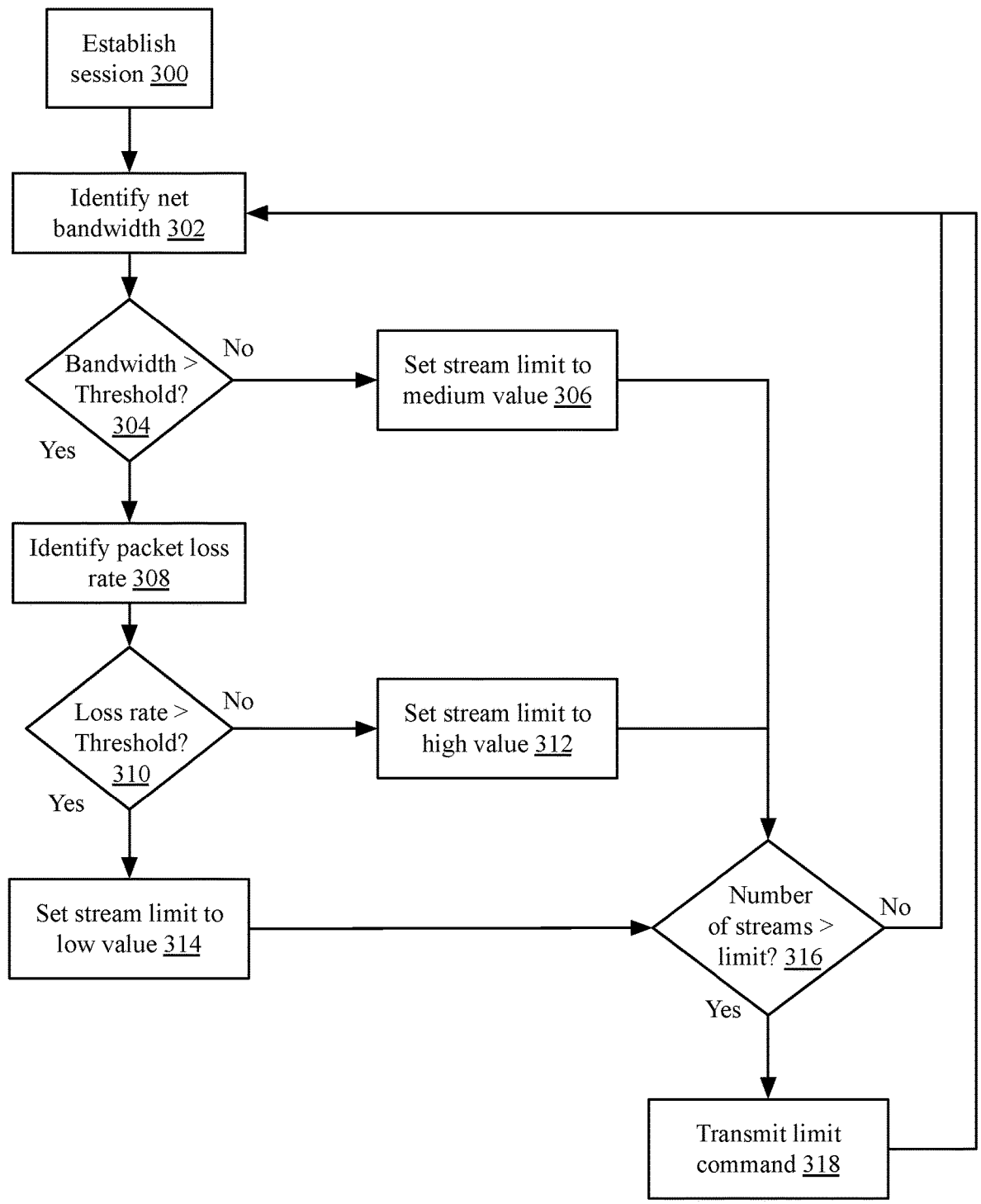
FIG. 3 is a flowchart of an embodiment of a method for dynamically optimizing the number of application layer streams that may be multiplexed into a single transport layer connection.

FIG. 3 is a flowchart of an embodiment of a method for dynamically optimizing the number of application layer streams that may be multiplexed into a single transport layer connection. At step 300, a device may establish a communication session with a second device. The communication session may comprise a plurality of concurrent application layer streams carried via a transport layer connection, such as a plurality of multiplexed HTTP/2 packets or payloads encapsulated in a single transport layer header. In some implementations, establishing the communication session may comprise performing a handshaking procedure, establishing parameters for the communication, or other such functions. As discussed above, the device may be an endpoint of the communication (e.g. a client, server, or other end point device), or may be an intermediary device receiving and forwarding communications to other end point devices. Thus, the transport layer connection may or may not terminate at the device.

At step 302, the device may identify a net bandwidth of the transport layer connection. Identifying the bandwidth may comprise measuring a throughput of the connection, a window size of the connection, a round trip time of the connection, or other such parameters representative of data throughput on the connection. For example, the device may measure the time to receive an acknowledgement to a transmission to the other device. In some implementations, measuring the bandwidth may comprise dividing a window size of the connection by a round-trip time for the connection.

At step 304, the device may determine if the net bandwidth is greater than a predetermined threshold. The threshold may be set by an administrator, manufacturer, or user, or may be dynamically determined, e.g., based on overall throughput of the device. For example, in some implementations, the threshold may be set to a fraction of a total throughput of the device.

If the net bandwidth is not greater than the predetermined threshold, then in some implementations, at step 306, the device may set a stream limit to a first predetermined value. The first predetermined value may be a default value, or may be a value lower than a predetermined default value. The value may be, for example, 10 concurrent application layer streams, 5 streams, 15 streams, or any other such value.

If the net bandwidth is greater than the predetermined threshold, then at step 308, the device may determine a packet loss rate for the connection. In some implementations, step 308 may be performed prior to step 304 and/or step 302. In some implementations, the packet loss rate may be measured by identifying a number of dropped packets or not received packets within a predetermined period, and/or by measuring a number of unacknowledged transmissions or retransmissions within the predetermined period. In some implementations, the device may receive a packet loss rate measurement from the remote device.

At step 310, the device may determine if the packet loss rate is greater than a second predetermined threshold. The threshold may be set by an administrator, manufacturer, or user, or may be dynamically determined, e.g., based on a fraction of throughput of the device. The second predetermined threshold may be different from the first predetermined threshold or net bandwidth threshold and use different units (e.g. dropped or lost packets per second, compared to bytes, kilobytes, or megabytes per second).

If the packet loss rate is not above the second threshold, then at step 312, the device may set a stream limit to a second predetermined value that may be greater than the first predetermined value of step 306. For example, the value may be 15 concurrent application layer streams, 10 streams, 20 streams, or any other such value, referred to generally as a "high" value in comparison to the "medium" value of step 306. The high value may be utilized because, if the packet loss rate is low, the device may not need to take congestion avoidance mitigation steps, as discussed above.

If the packet loss rate is above the second threshold, then at step 314, the device may set a stream limit to a third predetermined value that may be less than the first predetermined value of step 306 (and therefore less than the second predetermined value of step 312). For example, the value may 5 concurrent application layer streams, 2 streams, 10 streams, or any other such value, referred to generally as a "low" value in comparison to the medium value of step 306. The low value may be utilized because, if the packet loss rate is high (but the net bandwidth for the connection is above the first threshold), the system may mitigate congestion avoidance by spawning additional transport layer connections to carry application layer requests instead of multiplexing them into the established transport layer connection.

At step 316, in some implementations, the device may determine if a present number of concurrent streams is greater than the stream limit set at steps 306, 312, or 314. If not, then processing may continue and steps 302-316 may be repeated. Conversely, if the number of streams is greater than the limit, at step 318, the device may transmit a stream limit command to the other device. Transmitting the limit command may comprise transmitting a settings or configuration packet having a concurrent stream limit value equal to the stream limit, such as a packet comprising a SETTINGS_MAX_CONCURRENT_STREAMS value equal to the stream limit. The limit command may be sent on its own, or may be provided as part of a header (e.g. application layer header or transport layer header) of a packet of the established connection. Receipt of the limit command may cause the remote device, if it has further application layer data to send, to establish a second transport layer connection (e.g. initiating a new iteration of the method, starting at step 300).

In some implementations, the limit command 318 may be sent as part of every packet, and step 316 may be skipped. For example, in some implementations, the concurrent stream limit value may be sent in the header of every application layer packet, and thus, no determination of whether to send the value is required. In other implementations, at step 316 or in a separate step (not illustrated), the device may determine if the present number of streams is less than the limit, or less than the limit minus a predetermined value (e.g. less than the limit minus one, or the limit minus five, or any other such value). If so, the device may transmit the limit commend at step 318. This may allow the device to increase the number concurrent streams, for example after congestion or packet losses have recovered.

Thus, the systems and methods discussed herein provide for dynamically optimizing the number of application layer streams that may be multiplexed into a single transport layer connection, providing the advantages of application layer multiplexing without incurring unnecessary congestion-based network delays. The device may dynamically increase and decrease a number of concurrent application layer streams to balance throughput and congestion avoidance.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    establishing, by a first device, a plurality of streams multiplexed via a transport layer connection between the first device and a second device;
    determining, by the first device, a packet loss rate for the transport layer connection responsive to a bandwidth of the transport layer connection being greater than a first threshold; and
    changing, by the first device, a stream limit on the transport layer connection based at least on a comparison of the packet loss rate to a second threshold.

2. The method of claim 1, further comprising communicating, by the first device, a stream limit command to the second device responsive to detecting that a number of the plurality of streams is less than the stream limit, wherein the limit command causes the second device to increase a number of the plurality of streams multiplexed via the transport layer connection.

3. The method of claim 1, further comprising communicating, by the first device, a stream limit command to the second device responsive to detecting that a number of the plurality of streams is greater than the stream limit, wherein the limit command causes the second device to establish a second transport layer connection.

4. The method of claim 1, wherein the plurality of streams comprises application layer streams.

5. The method of claim 1, further comprising establishing, by the first device, an initial value for the stream limit.

6. The method of claim 1, further comprising increasing, by the first device, a value of the stream limit responsive to the packet loss rate being less than the second threshold.

7. The method of claim 1, further comprising decreasing, by the first device, a value of the stream limit responsive to the packet loss rate being greater than the second threshold.

8. The method of claim 1, further comprising determining, by the first device, the bandwidth based at least on one of the following: a throughput of the transport layer connection, a window size of the transport layer connection or a round trip time of the transport layer connection.

9. A system comprising:
    a first device comprising one or more processors, coupled to memory, and configured to:
    establish a plurality of streams multiplexed via a transport layer connection between the first device and a second device;
    determine a packet loss rate for the transport layer connection responsive to a bandwidth of the transport layer connection being greater than a first threshold; and
    change a stream limit on the transport layer connection based at least on a comparison of the packet loss rate to a second threshold.

10. The system of claim 9, wherein the first device is further configured to communicate a stream limit command to the second device responsive to detecting that a number of the plurality of streams is less than the stream limit, wherein the limit command causes the second device to increase a number of the plurality of streams multiplexed via the transport layer connection.

11. The system of claim 9, wherein the first device is further configured to communicate a stream limit command to the second device responsive to detecting that a number of the plurality of streams is greater than the stream limit, wherein the limit command causes the second device to establish a second transport layer connection.

12. The system of claim 9, wherein the plurality of streams comprises application layer streams.

13. The system of claim 9, wherein the first device is further configured to establish an initial value for the stream limit.

14. The system of claim 9, wherein the first device is further configured to increase a value of the stream limit responsive to the packet loss rate being less than the second threshold.

15. The system of claim 9, wherein the first device is further configured to decrease a value of the stream limit responsive to the packet loss rate being greater than the second threshold.

16. The system of claim 9, wherein the first device is further configured to determine the bandwidth based at least on one of the following: a throughput of the transport layer connection, a window size of the transport layer connection or a round trip time of the transport layer connection.

17. A non-transitory computer-readable medium comprising instructions that, when executed by one or more processors of a first computing device, cause the first computing device to:

establish a plurality of streams multiplexed via a transport layer connection between the first computing device and a second computing device;

determine a packet loss rate for the transport layer connection responsive to a net bandwidth of the transport layer connection being greater than a first threshold; and change a stream limit on the transport layer connection based at least on a comparison of the packet loss rate to a second threshold.

18. The computer-readable medium of claim 17, further comprising instructions that, when executed by the one or more processors, cause the first computing device to:

communicate a stream limit command to the second device responsive to detecting that a number of the plurality of streams is less than the stream limit, wherein the limit command causes the second device to increase a number of the plurality of streams multiplexed via the transport layer connection.

19. The computer-readable medium of claim 17, further comprising instructions that, when executed by the one or more processors, cause the first computing device to:

communicate a stream limit command to the second device responsive to detecting that a number of the plurality of streams is greater than the stream limit, wherein the limit command causes the second device to establish a second transport layer connection.

20. The computer-readable medium of claim 17, further first comprising instructions that, when executed by the one or more processors, cause the computing device to one of:

increase a value of the stream limit responsive to the packet loss rate being less than the second threshold or decrease the value of the stream limit responsive to the packet loss rate being greater than the second threshold.

* * * * *